United States Patent
Tsukimura

(10) Patent No.: US 8,264,735 B2
(45) Date of Patent: Sep. 11, 2012

(54) IMAGE PROCESSING APPARATUS, IMAGE FORMATION APPARATUS, IMAGE PROCESSING METHOD, AND RECORDING MEDIUM STORING PROGRAM

(75) Inventor: Shigeru Tsukimura, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 686 days.

(21) Appl. No.: 12/423,617

(22) Filed: Apr. 14, 2009

(65) Prior Publication Data

US 2010/0097655 A1 Apr. 22, 2010

(30) Foreign Application Priority Data

Oct. 20, 2008 (JP) ................................ 2008-269833

(51) Int. Cl.
*G06F 15/00* (2006.01)
(52) U.S. Cl. ........................................ 358/1.18; 398/80
(58) Field of Classification Search .................. 358/1.18
See application file for complete search history.

(56) References Cited

U.S. PATENT DOCUMENTS

| | | | | |
|---|---|---|---|---|
| 4,700,339 A | * | 10/1987 | Gordon et al. .................. 398/80 |
| 4,700,399 A | * | 10/1987 | Yoshida ........................ 382/167 |
| 5,295,236 A | * | 3/1994 | Bjorge et al. ................ 715/206 |
| 5,463,730 A | * | 10/1995 | Hatada ........................... 715/810 |
| 5,923,821 A | * | 7/1999 | Birnbaum et al. ............. 358/1.9 |
| 6,341,020 B1 | * | 1/2002 | Rumph et al. ................ 358/1.9 |
| 6,701,009 B1 | * | 3/2004 | Makoto et al. ................ 382/164 |
| 6,744,921 B1 | * | 6/2004 | Uchida et al. ................ 382/185 |
| 6,894,805 B2 | * | 5/2005 | Degani et al. ................ 358/1.4 |
| 7,206,446 B2 | * | 4/2007 | Sawada ........................ 382/167 |
| 2006/0262339 A1 | * | 11/2006 | Jacobs et al. ................ 358/1.14 |
| 2008/0130028 A1 | * | 6/2008 | Joergens et al. .............. 358/1.9 |
| 2008/0304696 A1 | * | 12/2008 | Eschbach et al. ............ 382/100 |
| 2009/0021754 A1 | * | 1/2009 | Cairns .......................... 358/1.9 |
| 2011/0052888 A1 | * | 3/2011 | Eschbach et al. ............ 428/199 |

FOREIGN PATENT DOCUMENTS

| | | | |
|---|---|---|---|
| JP | 10-200736 | * | 7/1998 |
| JP | 10-200736 A | | 7/1998 |
| JP | 2005-039422 A | | 2/2005 |

* cited by examiner

*Primary Examiner* — King Poon
*Assistant Examiner* — Helen Q Zong
(74) *Attorney, Agent, or Firm* — Sughrue Mion, PLLC

(57) ABSTRACT

An image processing apparatus, which includes: an extraction section that extracts a drawing element to be printed in a black color; a contour portion determination section that determines a contour portion of the drawing element extracted by the extraction section; and a controller that controls a printing unit such that, for a portion determined as the contour portion by the contour portion determination section, the portion is overprinted on a printed background image, and for a portion not determined as the contour portion by the contour portion determination section, the portion is printed without printing the background image.

24 Claims, 8 Drawing Sheets

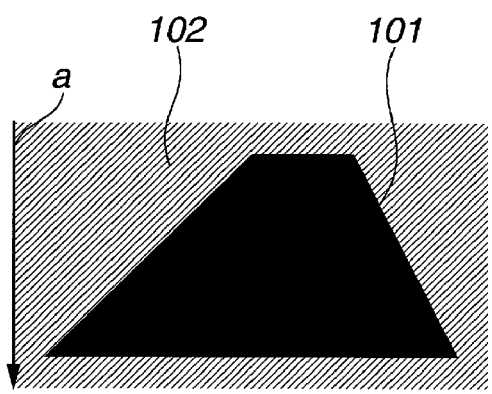
FIG.4A
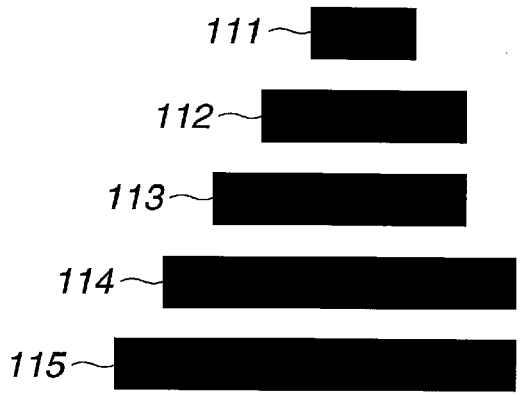
FIG.4B
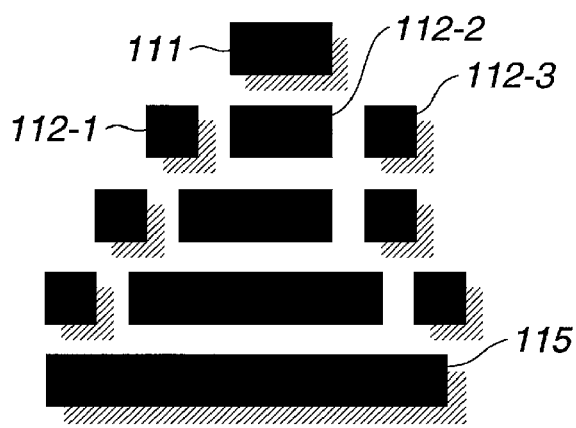
FIG.4C
| C | M | Y | K |
|---|---|---|---|
| 100 | 0 | 0 | 100 |
FIG.4D
| C | M | Y | K |
|---|---|---|---|
| 0 | 0 | 0 | 100 |
FIG.4E

IMAGE PROCESSING APPARATUS, IMAGE FORMATION APPARATUS, IMAGE PROCESSING METHOD, AND RECORDING MEDIUM STORING PROGRAM

CROSS-REFERENCE TO RELATED APPLICATION

This application is based on and claims priority under 35 USC 119 from Japanese Patent Application No. 2008-269833 filed on Oct. 20, 2008.

BACKGROUND

Technical Field

The present invention relates to an image processing apparatus, an image formation apparatus, an image processing method, and a recording medium storing a program.

SUMMARY

An aspect of the present invention provides an image processing apparatus, which includes: an extraction section that extracts a drawing element to be printed in a black color; a contour portion determination section that determines a contour portion of the drawing element extracted by the extraction section; and a controller that controls a printing unit such that, for a portion determined as the contour portion by the contour portion determination section, the portion is overprinted on a printed background image, and for a portion not determined as the contour portion by the contour portion determination section, the portion is printed without printing the background image.

BRIEF DESCRIPTION OF THE INVENTION

An exemplary embodiment of the present invention will be described in detail based on the following figures, wherein:

FIGS. 4A through 4E are diagrams for explaining a determination process in a case where a target object is a graphic;

DETAILED DESCRIPTION

Hereinbelow, with reference to the accompanying drawings, one exemplary embodiment of an image processing apparatus, an image formation apparatus, an image processing method, and a recording medium storing a program according to the present invention will be described in detail.

Figure 1A:
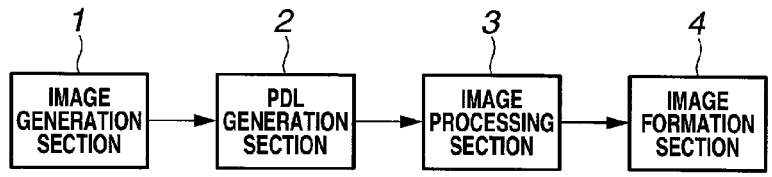
FIGS. 1A through 1C are diagrams for explaining an outline of an image processing apparatus.
Figure 1B:
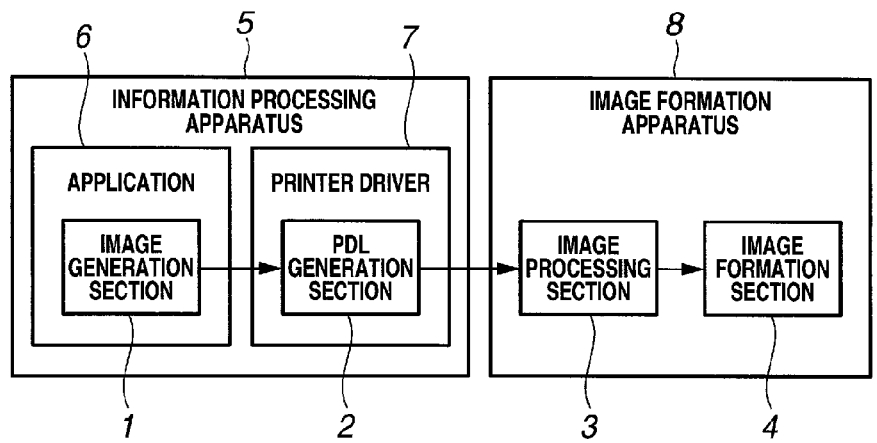
Figure 1C:
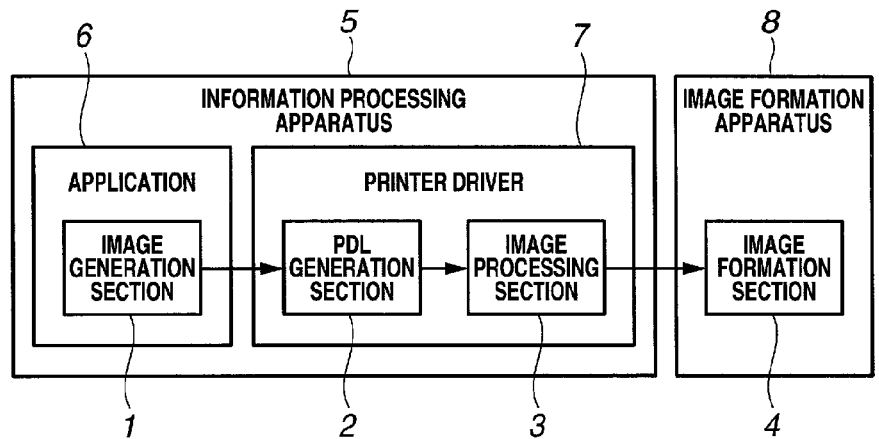

First, an outline of an image processing apparatus will be described. FIGS. 1A through 1C are diagrams for explaining the outline of the image processing apparatus.

As shown in FIG. 1A, the image formation processing is in general performed by: an image generation section 1 that generates image information indicating an image; a PDL generation section 2 that generates image information described in the PDL (Page Description Language) for making an instruction of printing on the basis of the image information generated by the image generation section 1; an image processing section 3 that performs processing of the image information, such as rasterization, on the basis of the image information described in the PDL; and an image formation section 4 that prints out an image on a paper sheet or the like on the basis of the image formation processed by the image processing section 3. In the following description, an image processing apparatus corresponds to the image processing section 3 above.

Additionally, there may be a case where the image processing section 3 is provided to an image formation apparatus such as printer, or a case where the image processing section 3 is provided to an information processing apparatus such as personal computer.

For example, as shown in FIG. 1B, in a case where an information processing apparatus 5 includes an application 6 for preparing documents or drawing diagrams, and a printer driver 7 for performing printing out, the image generation section 1 is incorporated in the function of the application 6, and the PDL generation section 2 is incorporated in the function of the printer driver 7. Additionally, the image formation apparatus 8 has functions corresponding to the image processing section 3 and the image formation section 4.

On the other hand, as shown in FIG. 1C, the image processing section 3 as well as the PDL generation section 2 may be incorporated in the function of the printer driver 7. In this case, the image formation apparatus 8 only has the image formation section 4 as the functional section.

Note that it may be possible to employ a form in which a functional section corresponding to the image processing section 3 is provided between the image processing apparatus 5 and the image formation apparatus 8 to use either of the apparatuses or both of the apparatuses in a cooperative manner.

Figure 2:
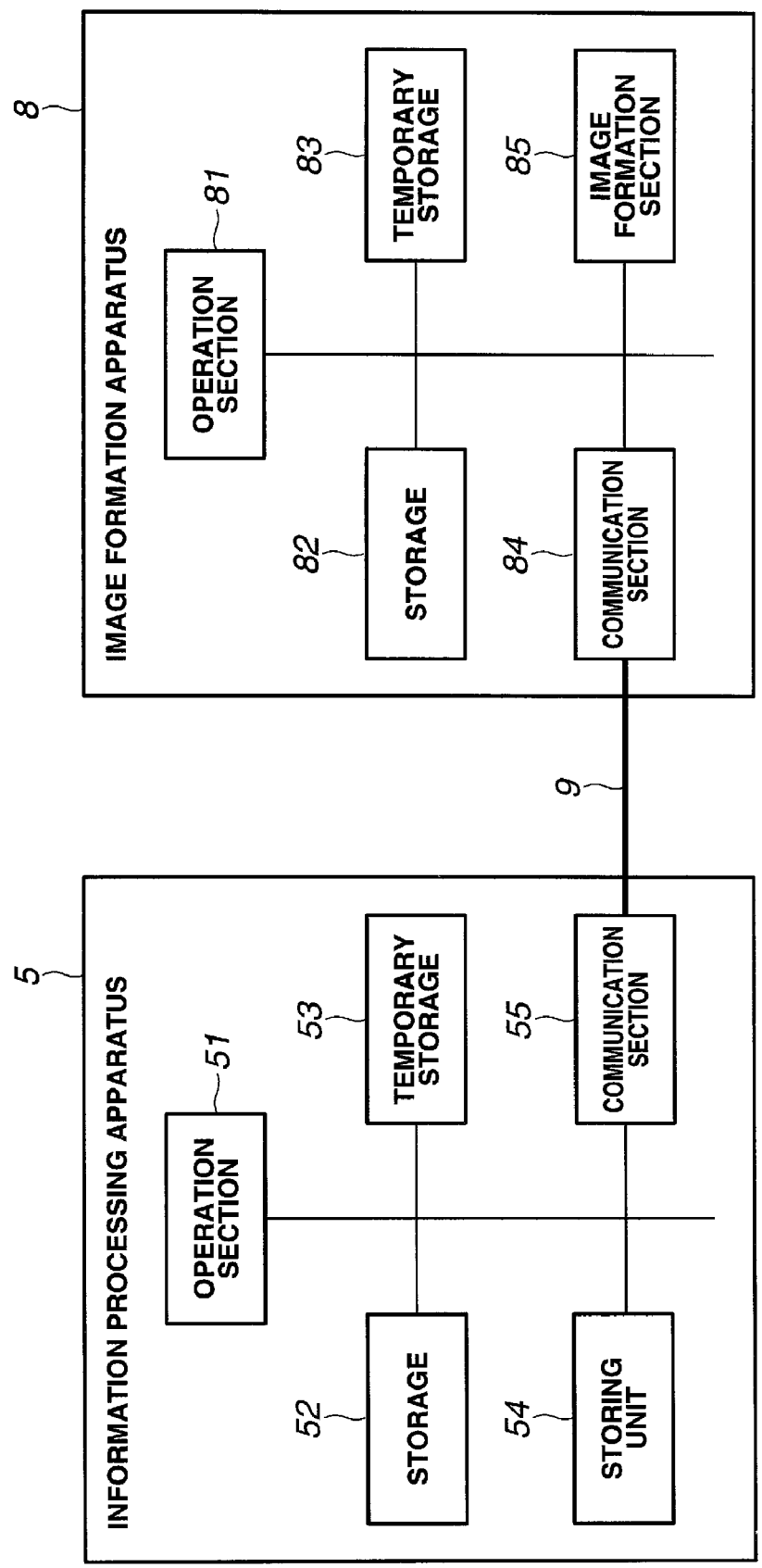
FIG. 2 is a schematic diagram showing an example of a configuration of an information processing apparatus 5 and an image formation apparatus 8.

Next, the configuration of the information processing apparatus 5 and the image formation apparatus 8 will be described. FIG. 2 is a schematic diagram showing an example of a configuration of the information processing apparatus 5 and the image formation apparatus 8.

As shown in FIG. 2, the information processing apparatus 5 has an operation section 51, a storage 52, a temporary storage 53, a storing unit 54, and communication section 55.

Additionally, the image formation apparatus 8 has an operation section 81, a storage 82, a temporary storage 83, a communication section 84, and an image formation section 85.

Note that communication means 9 connects the communication section 55 and the communication section 84, namely, the information processing apparatus 5 and the image formation apparatus 8 so as to be able to communicate each other.

The operation section 51 performs calculation processing and is realized, for example, by a processor such as a CPU (Central Processing Unit). The storage 52 stores information, etc. and is realized, for example, by a memory such as a ROM (Read Only Memory) or a nonvolatile memory. The temporary storage 53 is used as an operational space, etc. at the time when the operation section 51 performs the calculation processing, and temporarily stores information, etc. The temporary storage 53 is realized, for example, by a memory such as a RAM (Random Access Memory). The storing unit 54 stores information, etc., and is realized, for example, by a magnetic disk, etc. The communication section 55 is an interface for communicating through the communication means 9 and is realized, for example, by a network adapter.

The operation section 81 performs calculation processing and is realized, for example, by a processor such as a CPU. The storage 82 stores information, etc. and is realized, for example, by a memory such as a ROM or a nonvolatile memory. The temporary storage 83 is used as an operation space, etc. at the time when the operation section 81 performs the calculation processing and temporarily stores information, etc. The temporary storage 83 is realized, for example, by a memory such a RAM. The communication section 84 is an interface for communicating through the communication means 9 and is realized, for example, by a network adapter. The image formation section 85 performs image formation and includes a hardware for performing the image formation, a controller for controlling the hardware, and so on. Additionally, to the image formation apparatus 8, an input unit for inputting information, a display for showing information, and so on, are connected. Herein, the input unit and the display are incorporated in the image formation section 85.

Additionally, the communication means 9 is formed, for example, by a network such as a LAN (Local Area Network) or any other kinds of communication means.

By operating the operation sections 51, 81 using a program stored in the storage 52 or storing unit 55, and a program stored in the storage 82, respectively, the information processing apparatus 5 and the image formation apparatus 8 operate each of the functional sections shown in FIG. 1A through 1C including the image processing section 3.

Note that, at the time of their operations, the operation sections 51, 81 may operate other section.

Additionally, it may be possible to provide the programs for operating the operation sections 51, 81 to the information processing apparatus 5 and the image formation apparatus 8, respectively, by being stored in a storing medium readable by a computer, etc, such as CD-ROM (Compact Disk Read Only Memory), or through communication means such as the Internet or telecommunication lines.

Figure 3:
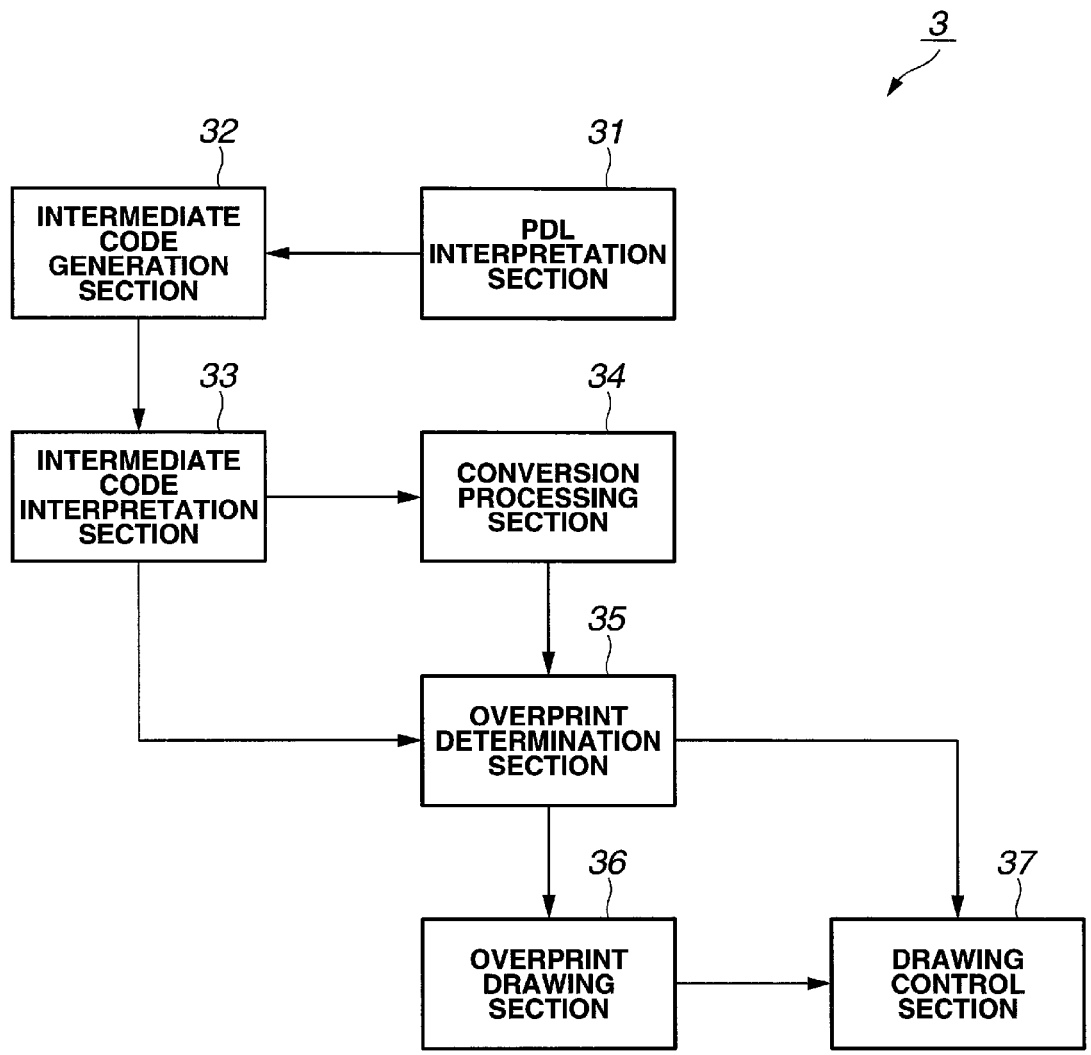
FIG. 3 is a diagram showing an example of a functional configuration of an image processing section 3.

Next, a functional configuration of the image processing section 3 will be described. FIG. 3 is a diagram showing an example of a functional configuration of the image processing apparatus 3.

As shown in FIG. 3, the image processing section 3 has a PDL interpretation section 31, an intermediate code generation section 32, an intermediate code interpretation section 33, a conversion processing section 34, an overprint determination section 35, an overprint drawing section 36, and a drawing control section 37.

The PDL interpretation section 31 interprets image information described in the PDL. The intermediate code generation section 32 generates an intermediate code of an object subject to drawing on the basis of the interpreted results by the PDL interpretation section 31. The intermediate code interpretation section 33 interprets the intermediate code generated by the intermediate code generation section 32. The conversion processing section 34 applies a scan conversion process to the object determined as being a graphic object as a result of the interpretation process made by the intermediate code interpretation section 33, to subject the graphic object to rasterization or other conversion process, including filling the graphic. The overprint determination section 35 determines whether the overprint process is applied to the graphic object having the conversion process applied by the conversion processing section 34 and a character object interpreted by the intermediate code interpretation section 33, and determines which portion the overprint is applied to. The overprint drawing section 36 performs a drawing process for overprinting for all or part of the object that is determined as being the object subjected to the overprint process. The drawing control section 37 performs a drawing process for all or part of the object having the drawing process applied by the overprint determination section 36 and/or for all or part of the object that is determined as being not the object subjected to the overprint process, and outputs the result including control information to the image formation section 4.

Here, the determination process performed by the overprint determination section 35 will be described in detail. FIGS. 4A through 4E are diagrams for explaining the determination process in a case where the target object is a graphic.

For example, it is assumed that the target object is a trapezoidal graphic 101 as shown in FIG. 4A, and the PDL specifies that the trapezoidal graphic is overprinted on a background 102. The graphic 101 is converted into bitmap data by applying the scan conversion process to the intermediate code formed by information of each vertex. The overprint determination section 35 divides the graphic in the form of bitmap data along a prescribed direction, for example, a sub-scanning direction of the scan conversion process (indicated by arrow a in FIG. 4A), for example, on a per pixel basis. The division of the graphic is not necessarily made on a per pixel basis, and may be made for each prescribed size. FIG. 4B shows the result of this division as one example. Note that, for the explanation purpose, in FIG. 4B, spaces are inserted between the divided partial graphics, and the size and the number of the pixels are different from the actual process.

Then, the overprint determination section 35 determines that, of the divided partial graphics, a partial graphic 111 and a partial graphic 115, all of the sides of which are an end portion, are contour portions that form the outline portion of the original graphic 101, and that the determined contour portions are the target portion of the overprinting process. Note that, for convenience purpose, the partial graphic 111 and the partial graphic 115 are referred to as an upper end and a lower end, respectively.

Additionally, when a partial graphic among the divided partial graphics is neither the upper end nor the lower end, and its length (length along the main-scanning direction in a case where the division is made along the sub-scanning direction) is a prescribed length or longer, for example, three pixels or longer, the overprint determination section 35 breaks the divided partial graphic into three pieces along the longitudinal direction. This breaking is made such that the broken pieces have a prescribed size, for example, the broken pieces at both ends have a size of one pixel. FIG. 4C shows one example of the result of the breaking process. Note that, in FIG. 4C, spaces are inserted between the broken or divided partial graphics for the explanation purpose.

Of the broken partial graphics, the overprint determination section 35 determines the broken partial graphics at both ends, for example, a partial graphic 112-1 and a partial graphic 112-3, which are obtained by breaking the partial graphic 112 into three pieces, as contour portions that form the outline portion, and identifies them as the target portions of the overprint processing. Note that, for convenience purpose, the partial graphic 112-1 and the partial graphic 112-3 are referred to as a left end and a right end, respectively.

In other words, the overprint determination section 35 divides and breaks the graphic 101; determines the divided or broken partial graphics located at the upper, lower, left and right ends as the contour portions to be overprinted; determines other portions, e.g., a partial graphic 112-2, as the portions that are not the contour portion; and excluding the not-contour portions from the target portions of the overprint processing.

Then, the overprint drawing section 36 and the drawing control section 37 are controlled such that the partial graphics located at the upper, lower, left and right ends and determined as the target portions of the overprint processing are overprinted by printing the black color (K: black) on the background color (in this example, density of cyan color (C: cyan) is set to 100) as shown in FIG. 4D, and the partial graphics determined as the not-target portions of the overprint processing are printed with black color (K: black) by removing the background color as shown in FIG. 4E.

Figure 5A:
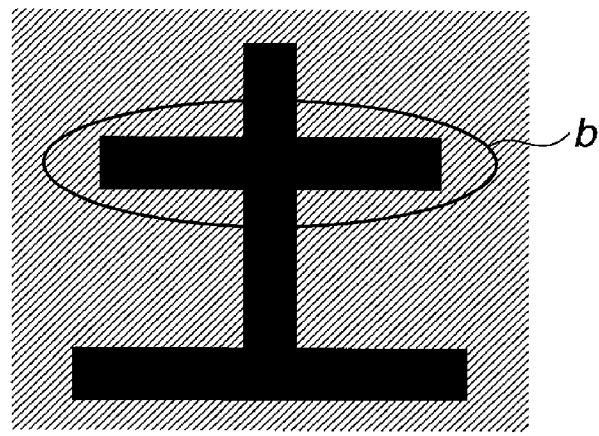
FIGS. 5A and 5B are diagrams for explaining a determination process in a case where the target object is a character.
Figure 5B:
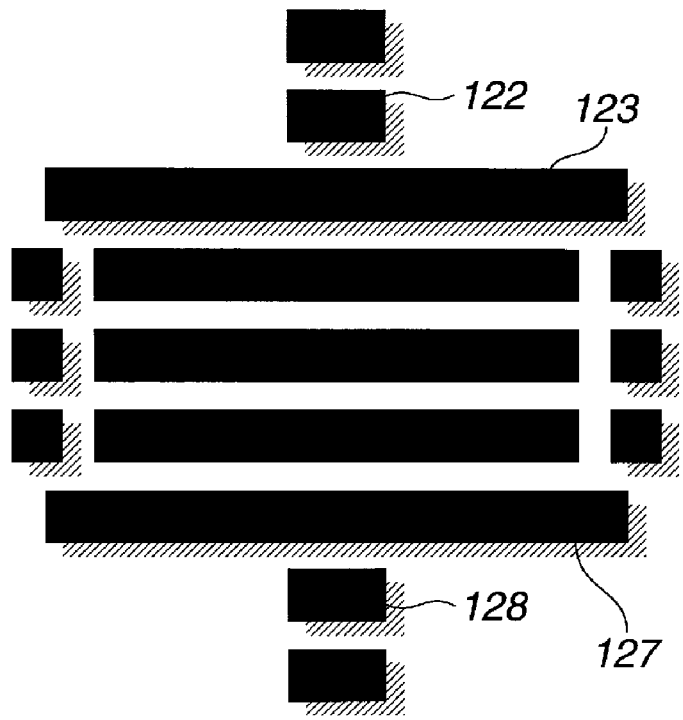

Next, the determination process performed by the overprint determination section 35 in a case where the target object is a character will be described. FIGS. 5A and 5B are diagrams for explaining the determination process in a case where the target object is the character.

Even in case where the target object is the character, the overprint determination section 35 basically performs the same process as the process in a case of the graphic. However, there is certain process specific to the case where the target object is the character. The process specific to the case of the character will be described below.

In a case where the target object is the character, e.g., where the target object is the Chinese character "土" as shown in FIG. 5A, the process specific to the case of the character object is performed around an intersection point of the first and the second strokes in the character as well as an intersection point of the second and the third strokes in the character.

FIG. 5B shows a result that the character "土" is divided around the first and the second strokes (portion surrounded by the broken line b in FIG. 5A). In this process, a partial character 123 and a partial character 127 are not broken into three pieces, which is the point different from the processing of the character.

In a case where the object is the character, if the length difference between the partial character divided along a prescribed direction and the adjacent partial character is equal to or longer than a prescribed value, the overprint determination section 35 determines this partial character as the contour portion and processes this partial character without breaking the determined partial portion into three pieces even if the determined partial character is not the upper or lower portion. This is because the unintended white patches are more likely to occur at this partial character. In an example shown in FIG. 5B, a partial character 123 whose length is much longer than that of a partial character 122 and a partial character 127 whose length is much longer than that of a partial character 128 are determined as the contour portion.

Note that characters are relatively small as compared with graphics, and there may be a case where the character is formed mainly by the narrow lines according to the font used. Thus, it may be possible to set the character size or font type as a condition, and determine the entire character as the contour portion when the character meets the set condition. Additionally, it may be possible to extend the range where the condition is met and to determine the entire portion of all the characters as the contour portion.

Figure 6:
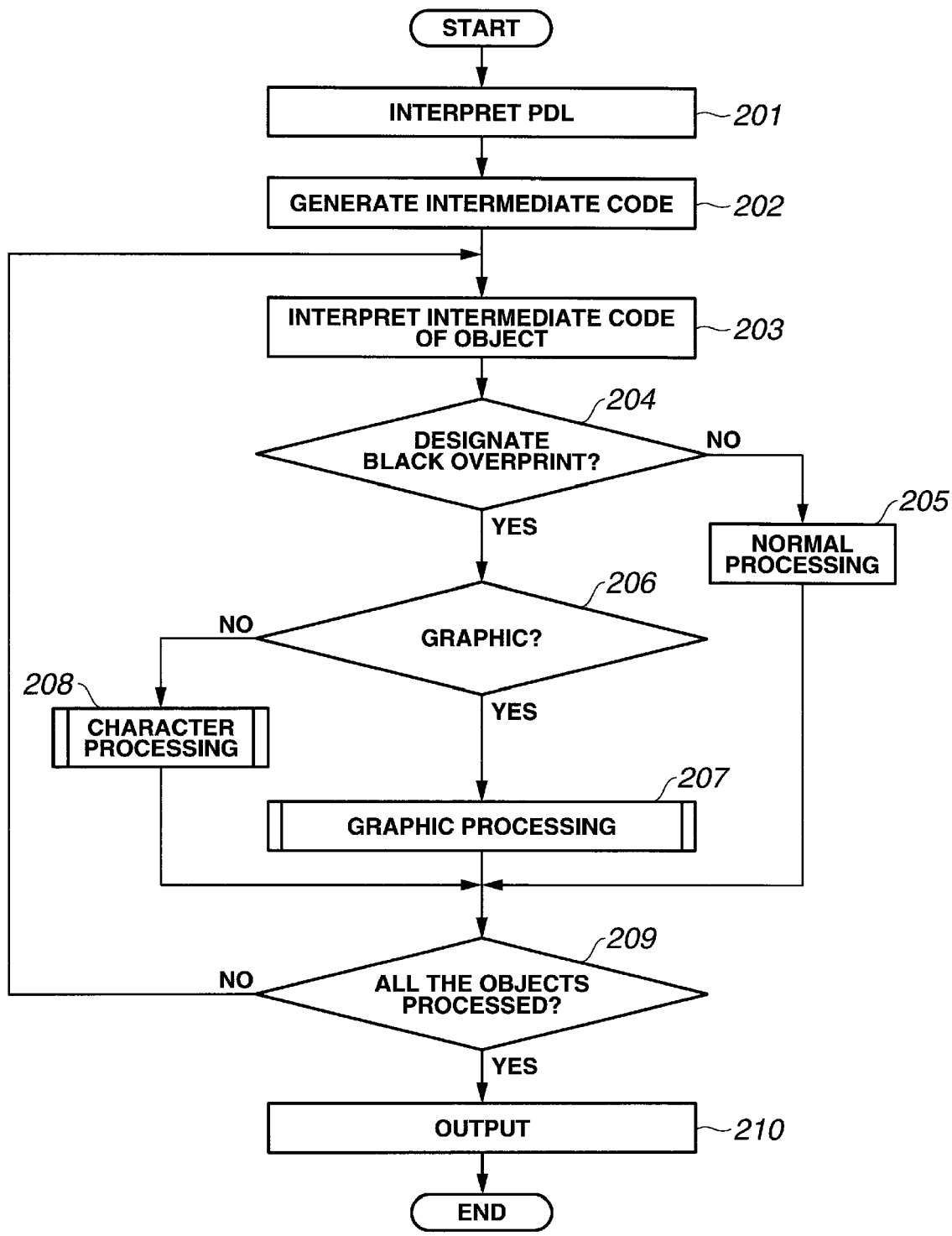
FIG. 6 is a flow chart illustrating a flow of image processing.

Next, a flow of the image processing performed by the image processing section 3 will be described. FIG. 6 is a flow chart showing a flow of the image processing.

In the image processing performed by the image processing section 3, the PDL interpretation section 31 first interprets image information described in the PDL (step 201), and the intermediate code generation section 32 generates the intermediate code in accordance with the interpretation result (step 202).

Next, the intermediate code interpretation section 33 interprets the intermediate code of the object (step 203). If the black overprint is not designated to the object (NO in step 204), the scan conversion processing by the conversion processing section 34, the drawing processing by the drawing control section 37 and other usual drawing processing are performed (step 205).

On the other hand, if the black overprint is designated to the object interpreted by the intermediate code interpretation 33 (YES in step 204), the overprint determination section 35 performs the determination processing. If the target object is a graphic (YES in step 206), processing corresponding to the graphic processing, which will be described later, is performed (step 207). If the target object is a character (NO in step 206), processing corresponding to the character processing, which will be described later, is performed (step 208).

Then, the processing above is performed for all the objects (NO in step 209). When all the objects are processed (YES in step 209), the image processing section 3 outputs the processing results to the image formation section 4 (step 210), then the image processing ends.

Figure 7:
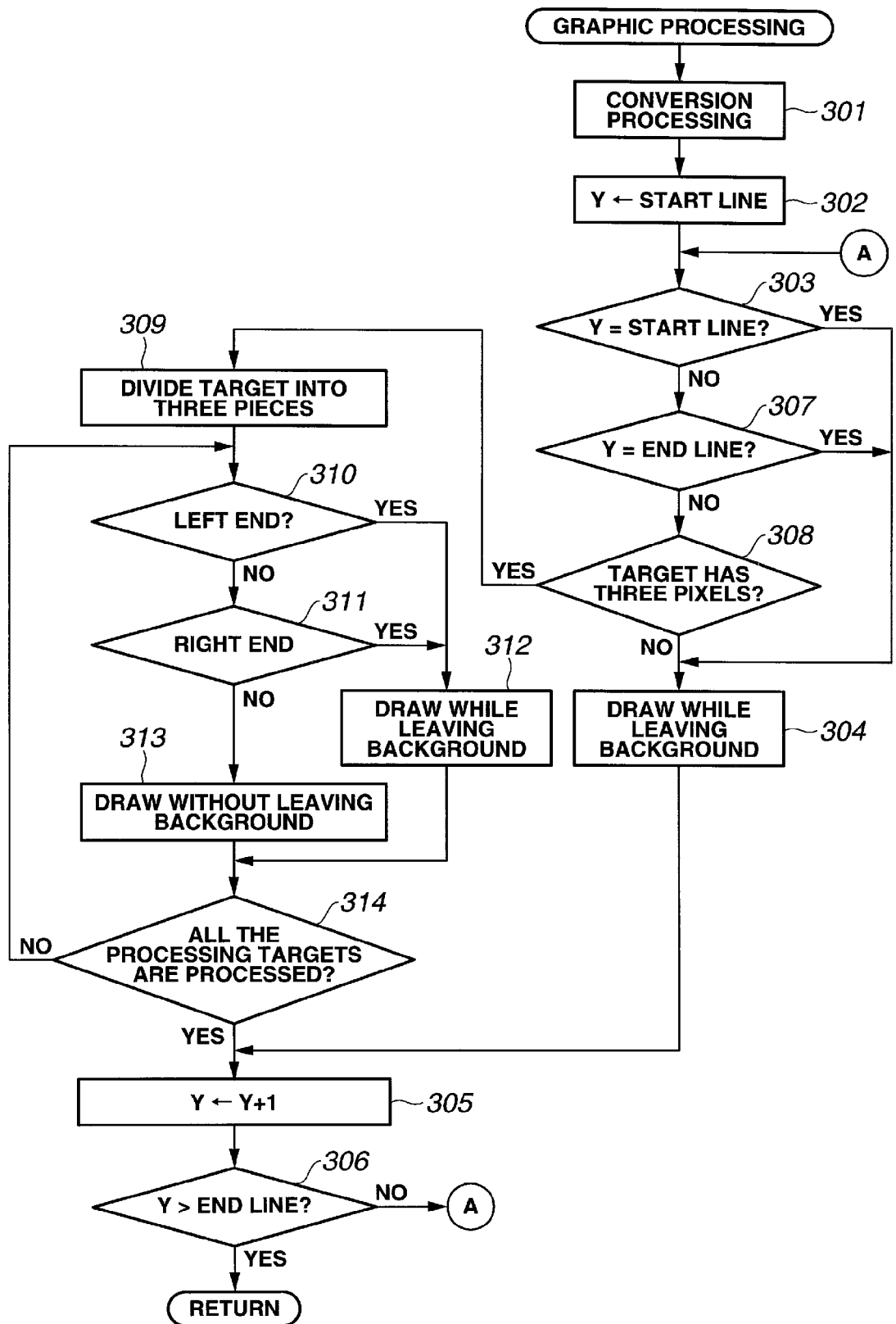
FIG. 7 is a flow chart illustrating a flow of graphic processing.

Next, a flow of the graphic processing in step 207 will be described. FIG. 7 is a flow chart illustrating the flow of the graphic processing.

In the graphic processing, the scan conversion processing is first performed as conversion processing by the conversion processing section 34 (step 301).

Then, the overprint determination section 35 performs the overprint determination process for the result of the conversion process. First, a value indicating a line number of a start line of the target graphic is substituted into the variable Y (step 302). In general, a line represents one of straight lines drawn in the same direction in the graphic, and the line herein represents straight lines drawn along the main-scanning direction of the scan conversion process by the conversion process section 34. The line that includes the upper end of the graphic is defined as the start line, while the line that includes the lower end of the graphic is defined as an end line. Those upper and lower lines are, for example, the lines including the partial graphic 111 and the partial graphic 115, respectively.

The overprint determination section 35 sequentially performs the determination process for each line of the graphic. If the variable Y indicates the start line (YES in step 303), the partial graphic to be processed corresponds to the upper end of the graphic. Thus, the overprint determination section 35 determines this partial graphic as the contour portion, and the overprint drawing section 36 performs the drawing process to draw the determined partial graphic while leaving the background (step 304).

Next, the overprint determination section 35 adds one to the value of the variable Y (step 305). If the value having one added is under the value of the end line (NO in step 306), the processing is performed to the line indicated by the variable Y. In a case where the variable Y indicates the line other than the start line and the end line (NO in step 303, and NO in step 307) and when the length of the partial graphic to be processed is smaller than a prescribed size, for example, smaller than three pixels (NO in step 308), the overprint determination section 35 determines the partial graphic as the contour portion, and the overprint drawing section 36 performs the drawing processing to draw the determined partial graphic while leaving the background (step 304).

On the other hand, in a case where the variable Y indicates the line other than the start line and the end line (NO in step 303, and NO in step 307) and when the length of the partial graphic to be processed is equal to or longer than a prescribed size (YES in step 308), the overprint determination section 35 breaks the partial graphic into three pieces (step 309), and determines the left end (YES in step 310) and the right end (NO in step 310 and YES in step 311) as the contour portion. Then, the overprint drawing section 36 performs the drawing processing to draw the partial graphic while leaving the background (step 312). For a portion not corresponding to the left and the right ends (NO in step 310 and NO in step 311), the overprint determination section 35 determines that the portion is not the contour portion, and the drawing control section 37 performs the drawing processing to draw the partial graphic without leaving the background (step 313). If the partial graphic is broken into three pieces, similar processing is performed to all the broken pieces (NO in step 314).

Additionally, if the variable Y indicates the end line (YES in step 307), the partial graphic to be processed is the lower end of the graphic. Thus, the overprint determination section 35 determines this partial graphic as the contour portion, and the overprint drawing section 36 performs the drawing processing to draw the partial graphic while leaving the background (step 304).

As described above, the processing of all the lines ends. In other words, if the value of the variable Y exceeds the value of the final end line (YES in step 306), the graphic processing ends.

Figure 8:
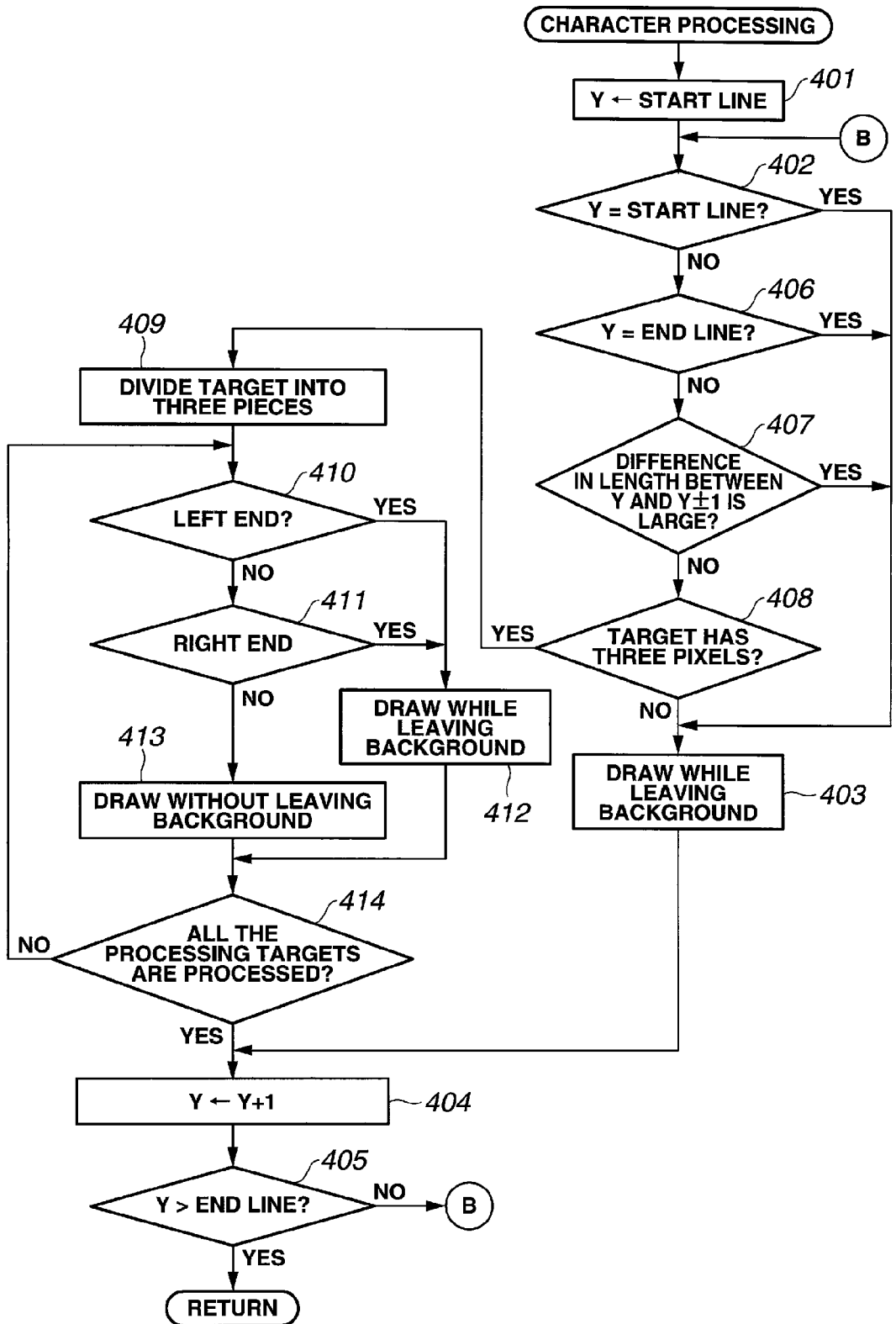
FIG. 8 is a flow chart illustrating a flow of character processing.

Next, a flow of the character processing in step 208 will be described. FIG. 8 is a flow chart illustrating a flow of the character processing.

In the case of the character processing, a value indicating the line number of the start line of the character to be processed is first substituted into the variable Y (step 401). Similarly to the case of the graphic processing, a line including the upper end of the character is referred to as a start line, and a line including the lower end of the character is referred to as an end line.

The overprint determination section 35 sequentially performs the determination process for each line of the character. If the variable Y indicates the start line (YES in step 402), the partial character to be processed corresponds to the upper end of the character. Thus, the overprint determination section 35 determines this partial character as the contour portion, and the overprint drawing section 36 performs the drawing process to draw the determined partial character while leaving the background (step 403).

Next, the overprint determination section 35 adds one to the value of the variable Y (step 404). If the value having one added is under the value of the end line (NO in step 405), the line indicated by the variable Y is processed. In a case where the variable Y indicates the line other than the start line and the end line (NO in step 402, and NO in step 406) and when the length difference between the partial character to be processed and the adjacent partial character is equal to or longer than a prescribed value (YES in step 407), the overprint determination section 35 determines the partial character as the contour portion, and the overprint drawing section 36 performs the drawing processing to draw the determined partial character while leaving the background (step 403).

Additionally, when the length difference between the partial character to be processed and the adjacent partial character is smaller than a prescribed value (NO in step 407) and when the length of the partial character to be processed is smaller than a prescribed size, for example, smaller than three pixels (NO in step 408), the overprint determination section 35 determines the partial character as the contour portion, and the overprint drawing section 36 performs the drawing processing to draw the determined partial character while leaving the background (step 403).

On the other hand, when the length of the partial character to be processed is equal to or longer than the prescribed size (YES in step 408), the overprint determination section 35 breaks the partial character into three pieces (step 409), and determines the left end (YES in step 410) and the right end (NO in step 410 and YES in step 411) of the broken partial character as the contour portion. The overprint drawing section 36 performs the drawing processing to draw the partial character while leaving the background (step 412). For a portion not corresponding to the left and the right ends (NO in step 410 and NO in step 411), the overprint determination section 35 determines that the portion is not the contour portion, and the drawing control section 37 performs the drawing processing to draw the partial character without leaving the background (step 413). If the partial character is broken into three pieces, similar processing is performed to all the broken pieces (NO in step 414).

Additionally, if the variable Y indicates the end line (YES in step 406), the partial character to be processed is lower end of the character. Thus, the overprint determination section 35 determines this partial character as the contour portion, and the overprint drawing section 36 performs the drawing processing to draw the partial character while leaving the background (step 403).

As described above, the processing of all the lines ends. In other words, if the value of the variable Y exceeds the value of the final end line (YES in step 405), the character processing ends.

Note that, as described earlier, the character processing is not always required. It may be possible to employ a configuration in which all or part of the characters are determined as the contour portions, and the overprint drawing section 36 performs the drawing processing to draw the characters while leaving the background.

The foregoing description of the exemplary embodiments of the present invention is provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus, comprising:
   an extraction section that extracts a drawing element to be printed in a black color;
   a contour portion determination section that determines a contour portion of the drawing element extracted by the extraction section; and
   a controller that controls a printing unit such that, for a portion determined as the contour portion by the contour portion determination section, the portion is overprinted on a printed background image, and for a portion not determined as the contour portion by the contour portion determination section, the portion is printed without printing the background image,
   wherein the contour portion determination section divides the drawing element along a prescribed direction as element portions, and determines that, among the divided element portions, an element portion corresponding to an end portion of the drawing element in the prescribed direction forms the contour portion, wherein the contour portion determination section determines that, among the element portions, an element portion that does not correspond to the end portion of the drawing element and whose length in a direction perpendicular to the prescribed direction is shorter than a prescribed length forms the contour portion.

2. The image processing apparatus according to claim 1, wherein, the contour portion determination section divides an element portion not corresponding to the end portion of the drawing element among the element portions into three portions in a direction perpendicular to the prescribed direction, and determines that divided portions at both ends form the contour portion.

3. An image processing apparatus, comprising:

an extraction section that extracts a drawing element to be printed in a black color;

a contour portion determination section that determines a contour portion of the drawing element extracted by the extraction section; and a controller that controls a printing unit such that, for a portion determined as the contour portion by the contour portion determination section, the portion is overprinted on a printed background image, and for a portion not determined as the contour portion by the contour portion determination section, the portion is printed without printing the background image, wherein the contour portion determination section divides the drawing element along a prescribed direction as element portions, and determines that, among the divided element portions, an element portion corresponding to an end portion of the drawing element in the prescribed direction forms the contour portion, wherein the contour determination section determines that, among the element portions, an element portion that does not correspond to the end portion of the drawing element and whose length difference from any of adjacent element portions in a direction perpendicular to the prescribed direction is larger than a prescribed length forms the contour portion.

4. An image processing apparatus, comprising:

an extraction section that extracts a drawing element to be printed in a black color;

a contour portion determination section that determines a contour portion of the drawing element extracted by the extraction section; and a controller that controls a printing unit such that, for a portion determined as the contour portion by the contour portion determination section, the portion is overprinted on a printed background image, and for a portion not determined as the contour portion by the contour portion determination section, the portion is printed without printing the background image, wherein the contour portion determination section divides the drawing element along a prescribed direction as element portions, and determines that, among the divided element portions, an element portion corresponding to an end portion of the drawing element in the prescribed direction forms the contour portion, wherein the contour determination section determines that, among the element portions, an element portion that does not correspond to the end portion of the drawing element and whose length difference from any of adjacent element portions in a direction perpendicular to the prescribed direction is smaller than a prescribed length is not the contour portion.

5. The image processing apparatus according to claim 1, further comprising:

a character determination section that determines whether the drawing element extracted by the extraction section is a character, wherein the contour determination section determines that all the portions of the drawing element determined as the character by the character determination section form the contour portion.

6. The image processing apparatus according to claim 1, further comprising:

a character determination section that determines whether the drawing element extracted by the extraction section is a character, wherein the controller controls the printing section such that all the portions of the drawing element determined as the character by the character determination section are overprinted on the printed background image, regardless of the determination result by the contour determination section.

7. An image formation apparatus, comprising:

a printing section that prints an image on the basis of print information;

an extraction section that extracts from the print information a drawing element to be printed in a black color;

a contour determination section that determines a contour portion of the drawing element extracted by the extraction section; and a controller that controls a printing section such that, for a portion determined as the contour portion by the contour portion determination section, the portion is overprinted on a printed background image, and for a portion not determined as the contour portion by the contour portion determination section, the portion is printed without printing the background image, wherein the contour portion determination section divides the drawing element along a prescribed direction as element portions, and determines that, among the divided element portions, an element portion corresponding to an end portion of the drawing element in the prescribed direction forms the contour portion, wherein the contour portion determination section determines that, among the element portions, an element portion that does not correspond to the end portion of the drawing element and whose length in a direction perpendicular to the prescribed direction is shorter than a prescribed length forms the contour portion.

8. A non-transitory computer readable recording medium storing an image processing program that causes a computer to execute a process, the process comprising:

extracting a drawing element to be printed in a black color;

determining a contour portion of the extracted drawing element; and performing a printing control such that, for a portion determined as the contour portion, the portion is overprinted on a printed background image, and for a portion not determined as the contour portion, the portion is printed without printing the background image, wherein the determining the contour portion comprises dividing the drawing element along a prescribed direction as element portions, and determining that, among the divided element portions, an element portion corresponding to an end portion of the drawing element in the prescribed direction forms the contour portion, wherein the determining the contour portion comprises determining that, among the element portions, an element portion that does not correspond to the end portion of the drawing element and whose length in a direction perpendicular to the prescribed direction is shorter than a prescribed length forms the contour portion.

9. An image formation apparatus, comprising:
a printing section that prints an image on the basis of print information;
an extraction section that extracts from the print information a drawing element to be printed in a black color;
a contour determination section that determines a contour portion of the drawing element extracted by the extraction section; and
a controller that controls a printing section such that, for a portion determined as the contour portion by the contour portion determination section, the portion is overprinted on a printed background image, and for a portion not determined as the contour portion by the contour portion determination section, the portion is printed without printing the background image,
wherein the contour portion determination section divides the drawing element along a prescribed direction as element portions, and determines that, among the divided element portions, an element portion corresponding to an end portion of the drawing element in the prescribed direction forms the contour portion,
wherein the contour portion determination section determines that, among the element portions, an element portion that does not correspond to the end portion of the drawing element and whose length difference from any of adjacent element portions in a direction perpendicular to the prescribed direction is larger than a prescribed length forms the contour portion.

10. An image formation apparatus, comprising:
a printing section that prints an image on the basis of print information;
an extraction section that extracts from the print information a drawing element to be printed in a black color;
a contour determination section that determines a contour portion of the drawing element extracted by the extraction section; and
a controller that controls a printing section such that, for a portion determined as the contour portion by the contour portion determination section, the portion is overprinted on a printed background image, and for a portion not determined as the contour portion by the contour portion determination section, the portion is printed without printing the background image,
wherein the contour portion determination section divides the drawing element along a prescribed direction as element portions, and determines that, among the divided element portions, an element portion corresponding to an end portion of the drawing element in the prescribed direction forms the contour portion,
wherein the contour portion determination section determines that, among the element portions, an element portion that does not correspond to the end portion of the drawing element and whose length difference from any of adjacent element portions in a direction perpendicular to the prescribed direction is smaller than a prescribed length is not the contour portion.

11. A non-transitory computer readable recording medium storing an image processing program that causes a computer to execute a process, the process comprising:
extracting a drawing element to be printed in a black color;
determining a contour portion of the extracted drawing element; and
performing a printing control such that, for a portion determined as the contour portion, the portion is overprinted on a printed background image, and for a portion not determined as the contour portion, the portion is printed without printing the background image,
wherein the determining the contour portion comprises dividing the drawing element along a prescribed direction as element portions, and determining that, among the divided element portions, an element portion corresponding to an end portion of the drawing element in the prescribed direction forms the contour portion,
wherein the determining the contour portion comprises determining that, among the element portions, an element portion that does not correspond to the end portion of the drawing element and whose length difference from any of adjacent element portions in a direction perpendicular to the prescribed direction is larger than a prescribed length forms the contour portion.

12. A non-transitory computer readable recording medium storing an image processing program that causes a computer to execute a process, the process comprising:
extracting a drawing element to be printed in a black color;
determining a contour portion of the extracted drawing element; and
performing a printing control such that, for a portion determined as the contour portion, the portion is overprinted on a printed background image, and for a portion not determined as the contour portion, the portion is printed without printing the background image,
wherein the determining the contour portion comprises dividing the drawing element along a prescribed direction as element portions, and determining that, among the divided element portions, an element portion corresponding to an end portion of the drawing element in the prescribed direction forms the contour portion,
wherein the contour portion determination section determines that, among the element portions, an element portion that does not correspond to the end portion of the drawing element and whose length difference from any of adjacent element portions in a direction perpendicular to the prescribed direction is smaller than a prescribed length is not the contour portion.

13. The image formation apparatus according to claim 7, further comprising:
a character determination section that determines whether the drawing element extracted by the extraction section is a character, wherein
the contour determination section determines that all the portions of the drawing element determined as the character by the character determination section form the contour portion.

14. The image formation apparatus according to claim 7, further comprising:
a character determination section that determines whether the drawing element extracted by the extraction section is a character, wherein
the controller controls the printing section such that all the portions of the drawing element determined as the character by the character determination section are overprinted on the printed background image, regardless of the determination result by the contour determination section.

15. The non-transitory computer readable recording medium according to claim 8, further comprising:

determining whether the drawing element extracted is a character, wherein the determining the contour portion comprises determining that all the portions of the drawing element determined as the character by the character determination section form the contour portion.

16. The non-transitory computer readable recording medium according to claim 8, further comprising:

determining whether the drawing element extracted is a character, wherein the printing control is performed such that all the portions of the drawing element determined as the character by the character determination section are overprinted on the printed background image, regardless of the determination result by the contour determination section.

17. The image forming apparatus according to claim 9, further comprising:

a character determination section that determines whether the drawing element extracted by the extraction section is a character, wherein the contour determination section determines that all the portions of the drawing element determined as the character by the character determination section form the contour portion.

18. The image forming apparatus according to claim 9, further comprising:

a character determination section that determines whether the drawing element extracted by the extraction section is a character, wherein the controller controls the printing section such that all the portions of the drawing element determined as the character by the character determination section are overprinted on the printed background image, regardless of the determination result by the contour determination section.

19. The image forming apparatus according to claim 10, further comprising:

a character determination section that determines whether the drawing element extracted by the extraction section is a character, wherein the contour determination section determines that all the portions of the drawing element determined as the character by the character determination section form the contour portion.

20. The image forming apparatus according to claim 10, further comprising:

a character determination section that determines whether the drawing element extracted by the extraction section is a character, wherein the controller controls the printing section such that all the portions of the drawing element determined as the character by the character determination section are overprinted on the printed background image, regardless of the determination result by the contour determination section.

21. The non-transitory computer readable recording medium according to claim 11, further comprising:

determining whether the drawing element extracted is a character, wherein the determining the contour portion comprises determining that all the portions of the drawing element determined as the character by the character determination section form the contour portion.

22. The non-transitory computer readable recording medium according to claim 11, further comprising:

determining whether the drawing element extracted is a character, wherein the printing control is performed such that all the portions of the drawing element determined as the character by the character determination section are overprinted on the printed background image, regardless of the determination result by the contour determination section.

23. The non-transitory computer readable recording medium according to claim 12, further comprising:

determining whether the drawing element extracted is a character, wherein the determining the contour portion comprises determining that all the portions of the drawing element determined as the character by the character determination section form the contour portion.

24. The non-transitory computer readable recording medium according to claim 12, further comprising:

determining whether the drawing element extracted is a character, wherein the printing control is performed such that all the portions of the drawing element determined as the character by the character determination section are overprinted on the printed background image, regardless of the determination result by the contour determination section.

* * * * *